United States Patent
Edvardsson et al.

(10) Patent No.: US 7,393,163 B2
(45) Date of Patent: Jul. 1, 2008

(54) DRILL WITH IMPROVED CUTTING INSERT FORMATION

(75) Inventors: Jan Edvardsson, Sandviken (SE); Jörgen Wiman, Sandviken (SE); Ake Sjölander, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 690 days.

(21) Appl. No.: 10/257,267

(22) PCT Filed: Apr. 9, 2001

(86) PCT No.: PCT/SE01/00795

§ 371 (c)(1),
(2), (4) Date: Dec. 9, 2002

(87) PCT Pub. No.: WO01/76794

PCT Pub. Date: Oct. 18, 2001

(65) Prior Publication Data

US 2004/0042859 A1    Mar. 4, 2004

(30) Foreign Application Priority Data

Apr. 11, 2000    (SE) ................... 0001347

(51) Int. Cl.
*B23B 51/02*    (2006.01)

(52) U.S. Cl. .............. 408/230; 408/144; 408/227; 408/713

(58) Field of Classification Search .......... 408/144, 408/226, 227, 230, 231, 233, 713; *B23B 51/02*
See application file for complete search history.

(56) References Cited

U.S. PATENT DOCUMENTS

| | | | | |
|---|---|---|---|---|
| 4,210,406 A | * | 7/1980 | Berry, Jr. | ............ 408/223 |
| 4,222,690 A | | 9/1980 | Hosoi | |
| 4,381,162 A | | 4/1983 | Hosoi | |
| 4,684,298 A | * | 8/1987 | Roos | ............ 408/59 |
| 4,817,742 A | * | 4/1989 | Whysong | ............ 175/420.1 |
| 4,950,108 A | * | 8/1990 | Roos | ............ 408/59 |
| 5,049,011 A | | 9/1991 | Bohnet et al. | |
| 5,273,380 A | * | 12/1993 | Musacchia | ............ 408/230 |

(Continued)

FOREIGN PATENT DOCUMENTS

JP    2001341020 A1 * 12/2001

(Continued)

*Primary Examiner*—Monica S. Carter
*Assistant Examiner*—Sara Addisu
(74) *Attorney, Agent, or Firm*—Drinker Biddle & Reath LLP

(57) ABSTRACT

A drill includes a tip-forming front end having at least two straight cutting edges and at least two chip flutes extending from the tip end towards a rear end. Each cutting edge includes an inner portion disposed near a center line of the drill, and an outer portion disposed farther from the center line. The peripheral end of each cutting edge is in the form of a smoothly curved nose portion protruding radially with respect to the center line. The nose portion is formed by several circular segments having mutually different radii ($R_1$, $R_2$, $R_3$). Adjacent ones of the radii are of different size.

15 Claims, 5 Drawing Sheets

U.S. PATENT DOCUMENTS

| | | | | |
|---|---|---|---|---|
| 5,312,209 | A * | 5/1994 | Lindblom | 408/230 |
| 5,492,187 | A * | 2/1996 | Neukirchen et al. | 175/394 |
| 5,630,681 | A | 5/1997 | Paya | |
| 5,634,745 | A * | 6/1997 | Wiman et al. | 407/113 |
| 5,807,041 | A * | 9/1998 | Lindblom | 408/230 |
| 5,918,105 | A * | 6/1999 | Anjanappa et al. | 419/66 |
| 5,971,673 | A * | 10/1999 | Berglund et al. | 408/1 R |
| 5,988,953 | A * | 11/1999 | Berglund et al. | 408/1 R |
| 6,086,980 | A | 7/2000 | Foster et al. | |
| 6,183,688 | B1 * | 2/2001 | Karlsson et al. | 419/18 |
| 6,217,263 | B1 * | 4/2001 | Wiman et al. | 407/114 |
| 6,224,302 | B1 * | 5/2001 | Cole | 408/224 |
| 6,244,791 | B1 * | 6/2001 | Wiman et al. | 407/114 |
| 6,485,235 | B1 * | 11/2002 | Mast et al. | 408/1 R |
| 6,527,486 | B2 * | 3/2003 | Wiman et al. | 408/188 |
| 6,551,035 | B1 * | 4/2003 | Bruhn et al. | 408/144 |
| 2003/0202853 | A1 * | 10/2003 | Ko et al. | 408/225 |

FOREIGN PATENT DOCUMENTS

| | | | |
|---|---|---|---|
| JP | 200236018 A | * | 2/2002 |
| SU | 1782196 A3 | | 12/1992 |
| WO | WO 99/00207 | * | 7/1999 |
| WO | WO 00/21704 | | 4/2000 |

* cited by examiner

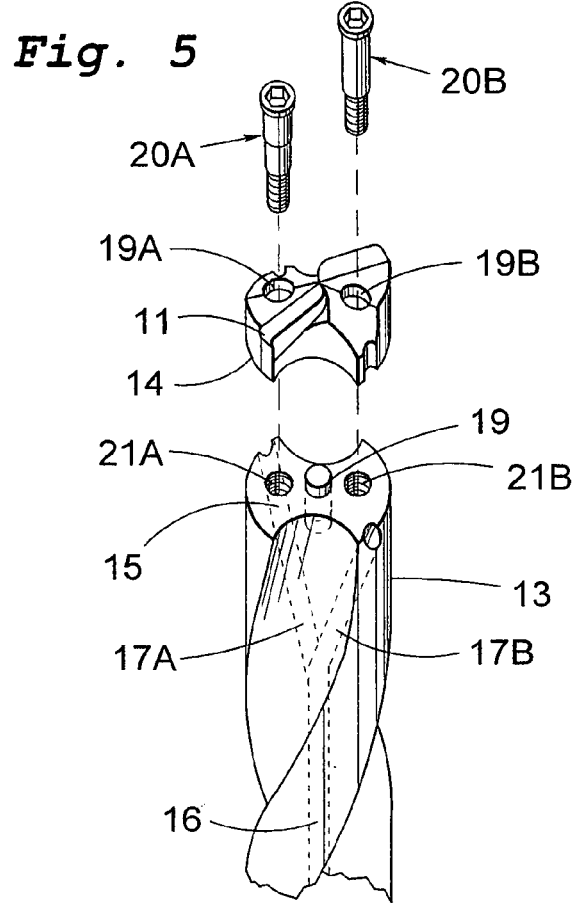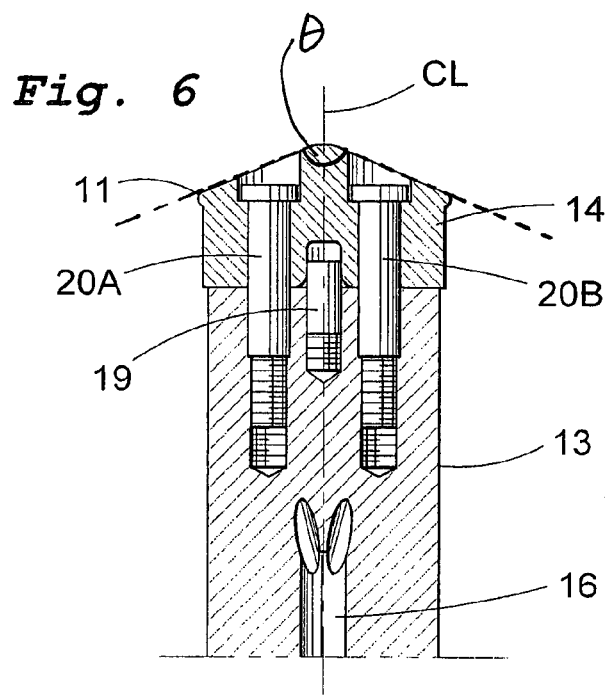

DRILL WITH IMPROVED CUTTING INSERT FORMATION

FIELD OF THE INVENTION

The present invention relates to a drill comprising a substantially solid shank with a first tip-forming end including at least two cutting edges for cutting machining of metallic workpieces in order to make holes in these, an opposite second end, and a number of flutes corresponding to the number of cutting edges, extending from the tip end towards the other end, having the purpose of forming and removing chips from the corresponding cutting edge.

BACKGROUND OF THE INVENTION AND DESCRIPTION OF THE PRIOR ART

The flutes of, e.g., a twist drill, have two important functions, viz. on the one hand the forming of chips (including chipbreaking) and on the other hand the removal of these formed chips. The chip formation occurs in a space immediately behind each cutting edge, regardless of whether the edge is formed by a sharpening of the drill top as such, or by a separate cutting insert which is fastened on the tip, mechanically or, by, e.g., brazing. In this front space of a flute, the initially bandlike material that is separated off by the cutting edge from a workpiece, is forced to curl and break, thus creating separate chips with a particular form and size.

When designing drills of the abovementioned type there is often difficulty in achieving desired high cutting speeds since thermal cracks often appear at the active cutting corner where such thermal cracks usually appear.

It is a first object of the invention to accomplish a new type of drill that enables achieving higher cutting speeds during metal drilling.

It is a second object of the invention to accomplish a new type if drill wherein the inserts have such optimized formation that high cutting speed becomes possible without impairing the surface finish of the hole wall in the hole to be drilled.

It is a third object to provide a drill wherein the drill inserts have been given such optimized formation that increased cutting speed becomes possible during drilling while maintaining good lifetime of the drilling tool.

These and other objects are being achieved by means of a drill that has been given the characterizing features that are outlined in the appending claims.

BRIEF DESCRIPTION OF THE DRAWINGS

In the drawings;

FIG. 5 is an exploded view of an alternative embodiment of the invention.

FIG. 6 is a cross-sectional view of the embodiment in FIG. 5.

DETAILED DESCRIPTION OF PREFERRED EMBODIMENTS OF THE PRESENT INVENTION

Figure 1:
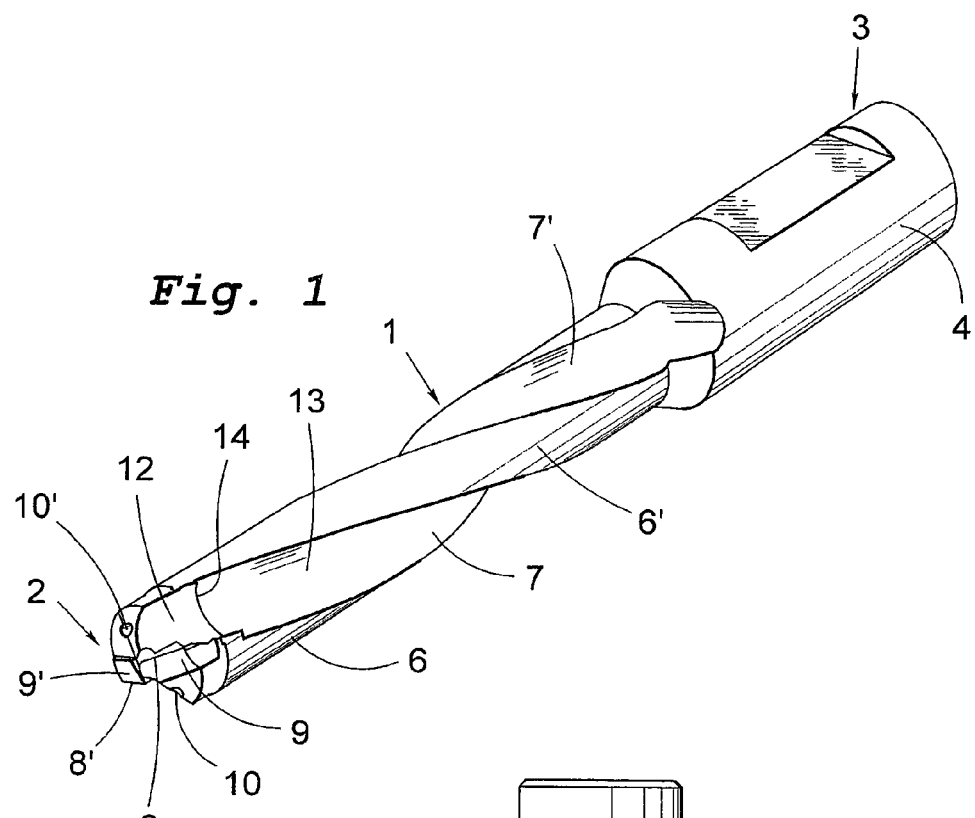
FIG. 1 is a perspective view of a drill according to the present invention.
Figure 2:
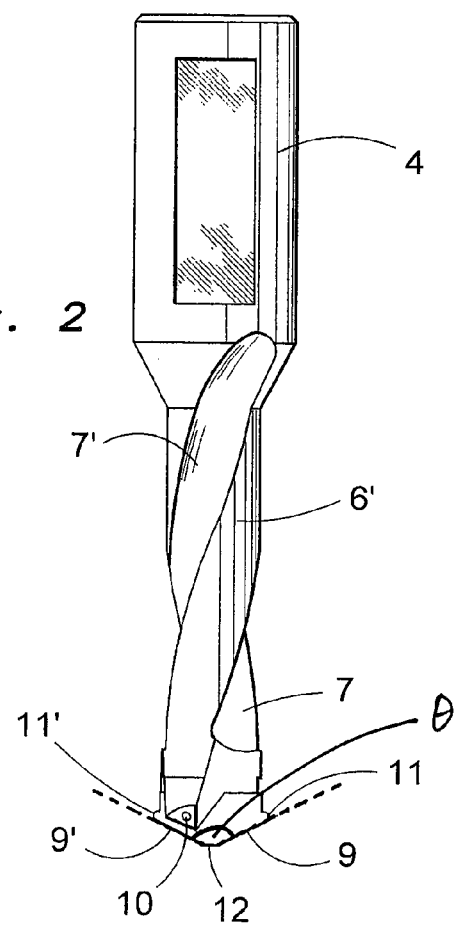
FIG. 2 is a schematical longitudinal view of a drill as shown in FIG. 1.
Figure 3:
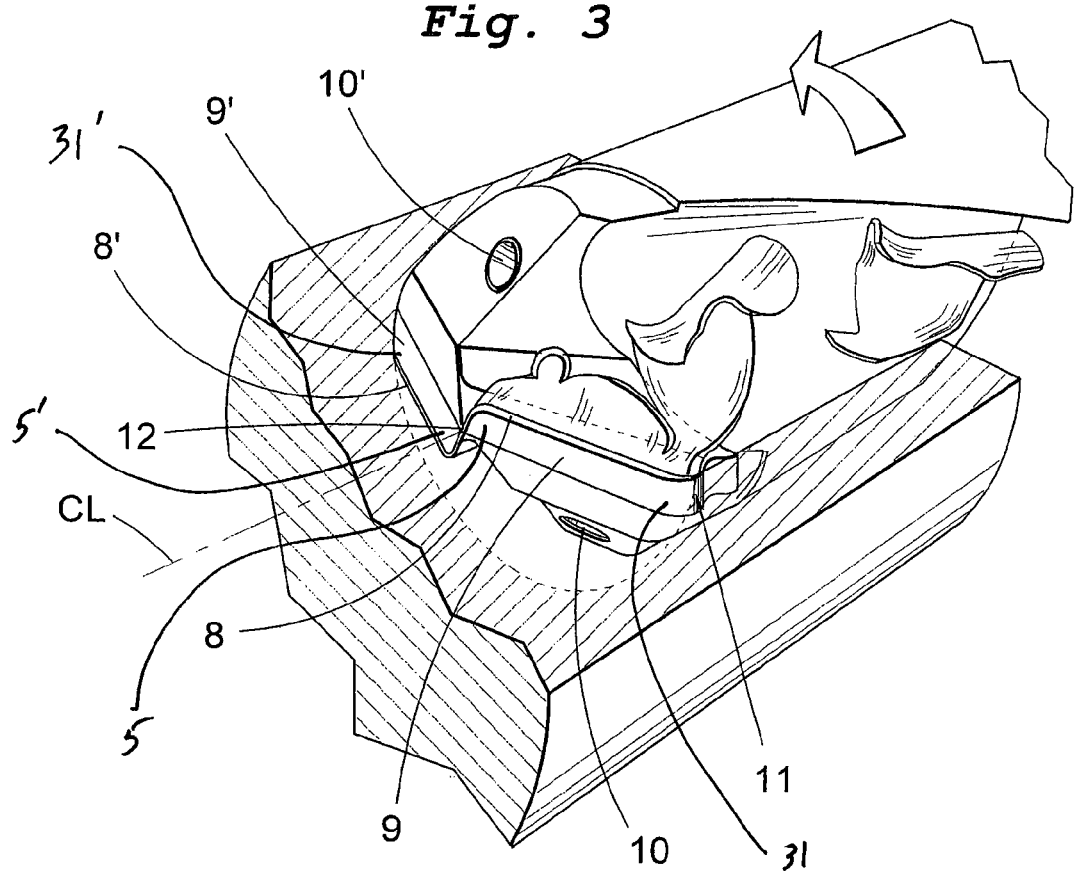
FIG. 3 is an enlarged perspective view of the drill tip as in FIG. 2.

In the drawings 1 generally designates a solid shank of a suitable tool steel with a first end or tip 2 and an opposite second end 3. At this second, rear end the shank of the shown embodiment has a thicker part 4 suitable for insertion into a holder. From a core two lands 6, 6' protrude, which delimit two flutes 7, 7'. In the illustrated embodiment the drill is a twist drill on which the lands 6, 6' as well as the flutes 7, 7' extend helically around the longitudinal axis of the shank. In practice, these flutes in known manner have a suitably uniform pitch angle within the range 20-30°. As alternative embodiments these flutes 7, 7' could be straight. At the tip 2, two cutting edges 8, 8' are provided, which in this case are formed on special cutting inserts 9, 9' that have been fixed to the tip in a suitable way, for instance by soldering. However, these cutting edges 8, 8' could equally well be formed by grinding of suitably formed surfaces on the shank per se or on a part, which is disconnectable with the shank. It should also be noted that the shank 1 can be provided with one or more axial ducts (see FIG. 3) which lead to two openings 10, 10' in the proximity of the cutting edges 8, 8'. In a known manner, cooling medium can be fed through these ducts to the drill tip. The term "solid shank" as used in the present description and in the following claims has the purpose of distinguishing the drill according to the invention from such drills that include pipe-formed shanks, but does not exclude such shanks which have one or several ducts for a cooling medium in an otherwise solid body.

Figure 4:
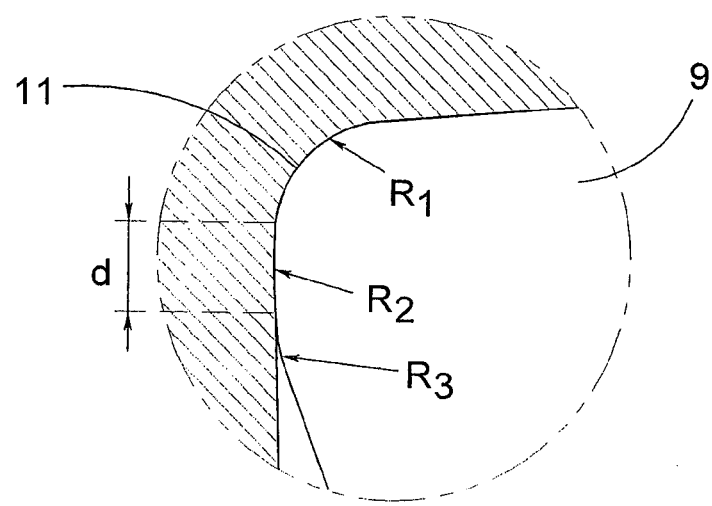
FIG. 4 is an enlarged side view of the nose portion of the drill insert as in FIG. 3.

In accordance with the invention the end portions of the edge surfaces of the insert are in the form of curved nose portions 11 preferably provided on corner portions that extend from the remainder of the insert. The nose radius surface of each such corner portion 11 shall be composed of one singular circle segment with a unitary radius, or of a plurality of circular segments which intersect with the top surface of the insert at intersection lines that constitute edge portions with several different radii $R_1$, $R_2$ and $R_3$ as shown in FIG. 4. When several radii are provided adjacent segments always appear with different radius portions along said edge portions. The radius $R_2$ shall always be substantially larger than $R_1$ which provides a surface finish improving "wiper-effect" along the edge d. This applies both during axial drilling forwardly into the workpiece as well as during axial displacement of the drill in opposite direction. The radius $R_3$ is somewhat smaller than both $R_1$ and $R_2$.

The straight cutting edges 8, 8' of the drilling tip have main edges that extend from an inner end 5, 5' to a peripheral end 31, 31' and are so formed that they mutually meet at an obtuse angle (θ) in the drill centre 12 where they together provide an S-shaped contour and positive rake surfaces along the cutting edges. The curvature of these cutting edges 8, 8' is larger in proximity of the drill centre line CL than further away therefrom. The rake surfaces are provided at zero rake angle in immediate vicinity of said centre line. This S-shaped contour in combination with said zero degree rake angle in the centre will contribute to formation of short comma-shaped chips, which can easily be taken away. The formation of the cutting edges 8, 8' and the formation of said rake surfaces is described more in detail in Swedish patent SE-A-7812393 which is hereby incorporated by reference.

FIG. 5 shows an alternative drill according to the invention comprising a drill body 13 and a separate drill tip 14. The front surface 15 of said drill body 13 is planar and perpendicularly oriented in relation to the centre line CL of the drill. A centrally provided flushing channel 16 extends from the anchoring end to a position located axially inside the front surface 15. The channel 16 is communicating with two diametrically opposed channels 17A and 17B, which terminate at the periphery of said front surface 15. Each of the short channels 17A and 17B is provided at an acute angle from the centre line CL which has a value between 15° and 20°. The drill tip 14 has a cylindrical basic shape with partially conical upper surface. The drill tip 14 also comprises chip flutes, which are provided as extensions of the chip flutes 7, 7'. On its underneath side a central recess 18 is provided (see FIG. 6) to receive a resilient tap 19 of the drill body 13. The drill tip 14 has also been provided with two bores 19A and 19B which are arranged for the receipt of screws 20A and 20B which are received in the drill tip and arranged to be threadably engaged in the drill body 13 in correspondingly provided bores 21A and 21B.

In an alternative embodiment of the invention the drill is provided as a straight solid drill body, the front portion of which comprises two symmetrical cutting edges which meet at the drill centre, the peripheral portions of which are provided with a nose radius surface according to the invention. The drill body in this case consists of a composite cemented carbide body comprising a core and a surrounding tube, said core consisting of a relatively tough cemented carbide grade and the tube consisting of a more wear resistant cemented carbide grade. The core portion consists of a WC—Co-grade comprising 5-20, preferably 10-15 weight-% Co, whereas the external tube portion consists of 8-20 weight-% of one or more carbides and/or carbonitrides in group 4-6, preferably Ti, Ta or Nb. The difference in Co-content between the core and the tube ought to be 2-4 weight-%. There ought to be a transition zone of 300-500 µm width measured as change in Co-content between the core and the tube.

For the purpose of avoiding problems in the manufacture of such composite drill body and thermal cracks connected therewith the tube hollow ought to be made by powder metallurgical means comprising pressing in two steps according to the method described in Swedish patent 9604779-0 the content of which is incorporated herewith.

In order to get good surface finish in the hole to be drilled it has been found that the different radii of the radiused edges when selecting formation of nose radius portion 11 comprising several circular segments ought to be selected in the following range:

$R_1$: 0.1-2.0 mm, preferable 0.2-1.6 mm
$R_2$: 1.6-10.0 mm
$R_3$: 0.1-1.0 mm

When selecting size of the singular radius this ought to be in the range of 0.1-10 mm. When using drills with a basic geometry and a nose radius surface according to the invention it has been found possible during hole drilling in low alloyed steel to double the cutting speed. In one instance a cutting speed of 100 m/min was used whilst it was possible, after switching to an insert with a nose radius formation according to the invention, to achieve a cutting speed of 250 m/min. At the same time it was found possible to maintain the lifetime of the drill which indicates the superiority that can be achieved with a drill insert having a nose radius formation according to the invention.

Figure 7:
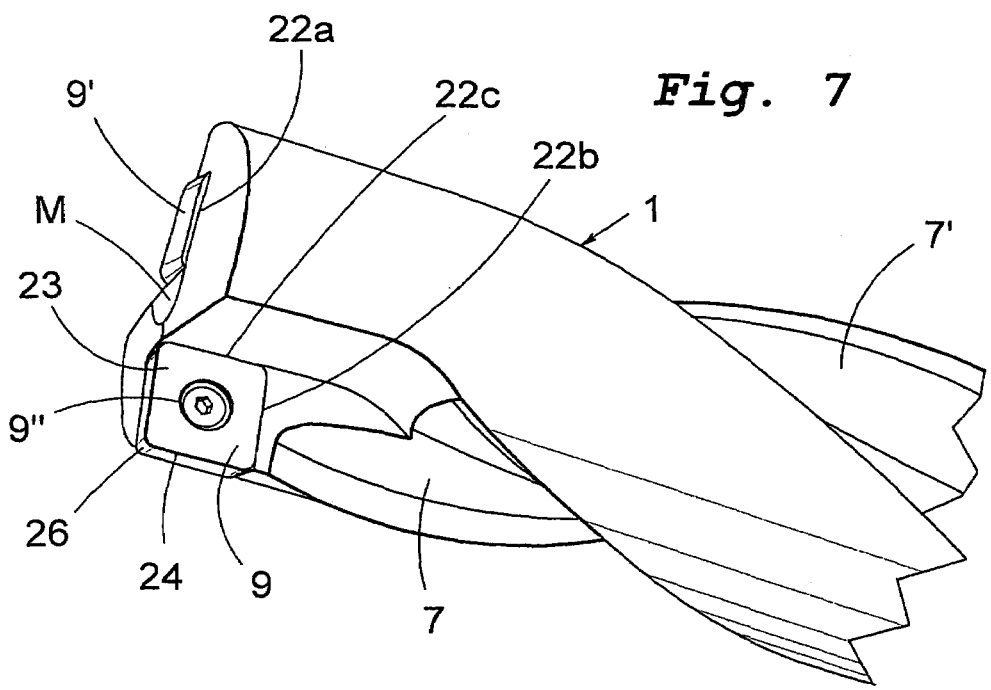
FIG. 7 is a perspective view showing an alternative embodiment.
Figure 8:
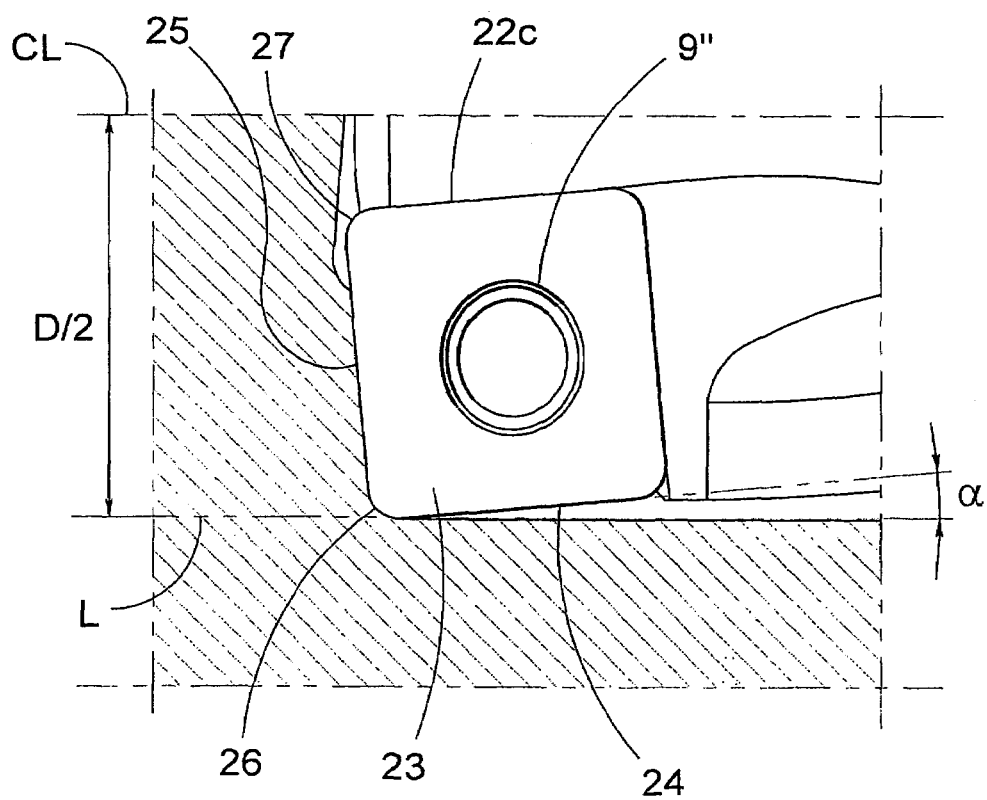
FIG. 8 is a somewhat enlarged side view showing a drill pursuant to FIG. 7.

The drill shaft 1 in FIGS. 7-8 has two flushing channels 7, 7' located adjacent to the insert pockets which can be helically shaped or be straight whilst being arranged on mutual sides of the centre line CL. The drill shaft 1 can also include channels (not shown) for transmitting flushing fluid to the cutting end of the drill.

The insert pockets are designed for the receipt of two inserts 9, 9' which have a central hole 9" and is intended to be clamped by means of a central screw that is threadably engaged in the drill shaft. One of the inserts is a central insert 9' whereas the other insert is an outer insert 9 that is inclined in relation to the centre line CL at an angle α such that the size of the hole is defined therefrom. Between the outer and the inner inserts there is a waist portion M that has sufficient width such that necessary strength is achieved. The dimensions of the drill are defined by a diameter D. Each insert pocket comprises a tangential support surface 22a, an axial support surface 22b and a radial support surface 22c.

Each insert has polygonal basic shape, in this case a square basic shape with two opposite flat surfaces 23 which are connected by four to each other perpendicularly arranged edge surfaces. The bottom surface of the insert is smaller than the upper surface 23 such that the insert appears with a positive clearance angle. The intersection lines between the side surfaces and the upper surface provide main cutting edges 24, 25 where each main edge is straight unbroken and smoothly rounded at its ends to the nose portion 26, 27.

As appears from FIG. 8 the outer insert 9 is inclined outwards in relation to the central axis CL. The central insert 9' could be located a bit axially in front of the outer insert 9 in order to promote a better guidance of the radial forces such that desired diameter can be maintained. The outer insert is inclined at an angle α in relation to a line L that is parallel with central axis CL. The size of angle α ought to be 0.5-5°.

Figure 9:
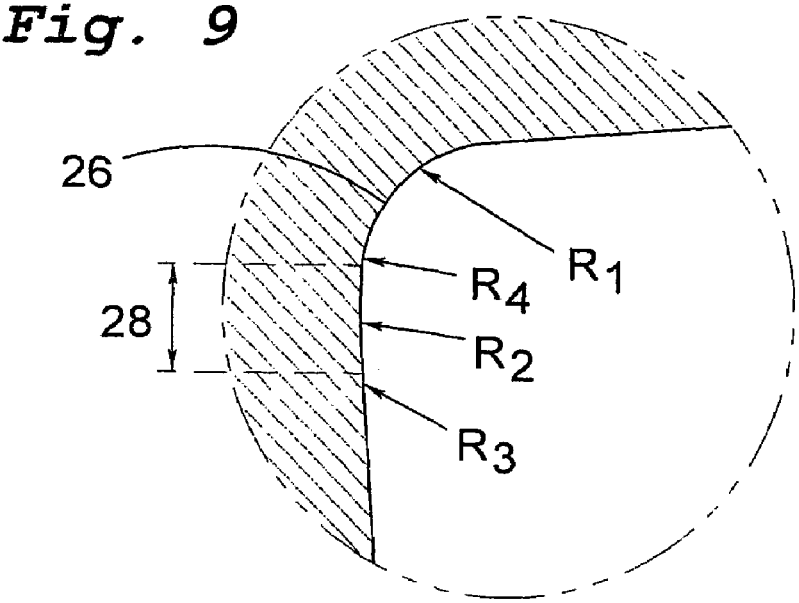
FIG. 9 is an enlarged side view of the nose portion of a drilling insert according to an alternative embodiment.

In accordance with the invention the end portions of the edge surfaces are in the form of curved nose portions 26, 27 provided at corner portion wherein each such corner portion is confined by a plurality of circular segments which intersect with the upper insert surface to provide edge portions with several different radii $R_1$, $R_2$ and $R_3$ as shown in enlarged section in FIG. 9. Adjacent segments always appear with different radius portions along said edge portions. The radius $R_2$ shall always be substantially larger than $R_1$, which contributes to a surface finish improving "wiper"-effect along the secondary edge 28. This applies both at machining by axial drilling forwards into the workpiece as well as during axial displacement of the drill in opposite direction. The radius $R_3$ is somewhat smaller than both $R_1$ and $R_2$.

The primary curved edge 26 should have a radius $R_1$ that is somewhat smaller at a position adjacent the main cutting edge 24 compared with radius $R_2$ of the secondary cutting edge 28. Further, there should also be arranged a curved edge with a somewhat smaller radius $R_4$ as compared with the radius $R_1$ that is provided between the curved nose edge 26 and the secondary cutting edge 28.

Figure 10:
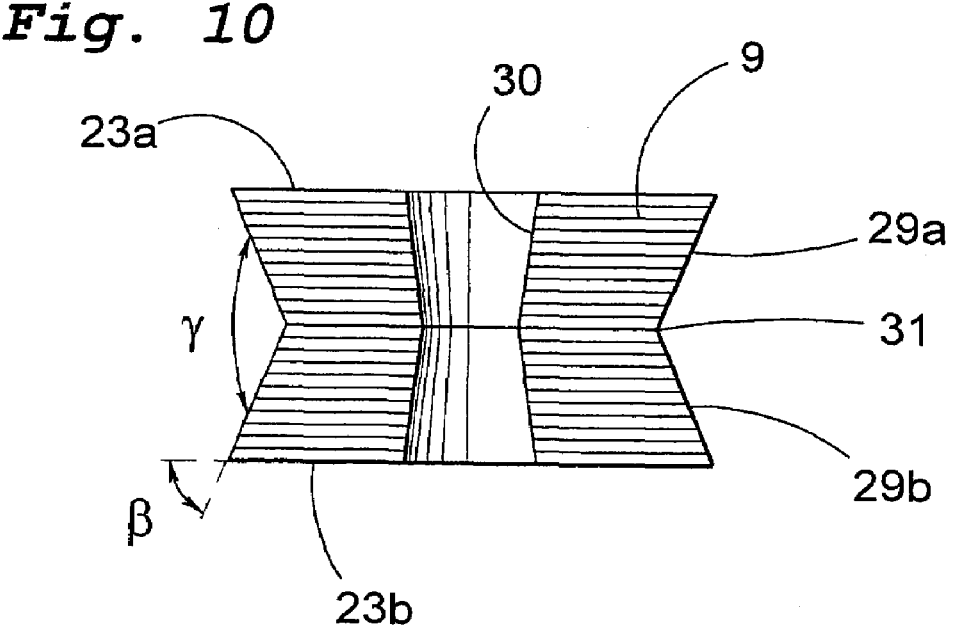
FIG. 10 is a cross-sectional view of a drilling insert according to an alternative embodiment of the invention.

FIG. 10 shows an embodiment of the insert 9 of the invention where the insert has a double-positive geometry. This means that the insert has equally large top and bottom surfaces 23a, 23b both of which however intersect with the edge surfaces 29a, 29b at an acute angle β.

The edge surfaces 29a, 29b are thus composed of inwards-downwards directed edges, which meet at an obtuse angle γ such that a clear waist portion 31 is provided. This enables the insert to be used as indexable insert whilst using twice the number of edges compared with a single-sided insert. The central hole 30 of the insert has a cross-section that diminishes from the top surface 23a and inwards and similarly the hole has a diminishing cross-section from the bottom surface 23b and inwards towards the centre of the insert.

As regards radii $R_1$ and $R_2$ the selected dimension depends from the diameter of the drill. For drill diameters 13-18 mm $R_1$ should be 0.2-0.4 mm and $R_2$ should be 1.6-4.0 mm. For drills in diameter area 18-58 mm $R_1$ should be 0.4-1.6 mm and $R_2$ should be 2.5-10 mm. Radius $R_4$ should be 0-1.0 mm. The length of secondary edge 28 should be in the range 0.1-0.5 mm.

The invention claimed is:

1. A drill comprising a generally solid shaft which defines a center line and includes:
    a rear mounting end portion;
    a front end portion disposed opposite the mounting end portion and provided with at least two cutting edges, each cutting edge including a main edge extending from an inner end to a peripheral end wherein the inner end is located closer to the center line, each cutting edge being inclined wherein the inner end is located axially forward of the peripheral end; and
    a plurality of flutes formed in an outer surface of the shaft, each flute extending from a respective cutting edge towards the rear mounting end portion for forming chips,
    wherein the main edge at the peripheral end has a curved shape,
    wherein said curved shape includes a plurality of circular segments having different radii, said plurality of segments including a front segment having a first radius, an intermediate segment having a second radius, and a rear segment having a third radius, said front segment having a radius which is smaller than the radius of the intermediate segment and greater than the radius of the rear segment,
    wherein the intermediate segment is a secondary cutting edge of the cutting edge, and has a wiper effect and wherein the second radius is larger than either the first radius or the third radius and
    wherein the intermediate segment is positioned between the front segment and the rear segment.

2. The drill according to claim 1 wherein the cutting edges are arranged symmetrically with respect to the center line and meet to form an obtuse angle.

3. The drill according to claim 1, wherein the cutting edges are disposed on a body attached to the front end portion of the shaft.

4. The drill according to claim 3, wherein the body is formed of cemented carbide and is soldered to the shaft.

5. The drill according to claim 3, wherein the body is releasably attached to the shaft.

6. The drill according to claim 1, wherein the shaft is in the form of a composite including a core portion formed of a tough first cemented carbide grade containing 5-10 weight % Co, and an outer tube-shaped portion which comprises the curved nose portion, the tube-shaped portion being formed of a second cemented carbide grade which is more wear resistant than the first grade and contains 8-20 weight % of at least one of carbides and carbonitrides of Ti, Ta or Nb.

7. The drill according to claim 6, wherein the cutting edges are arranged symmetrically with respect to the center line and meet to form an obtuse angle.

8. The drill according to claim 6, wherein the radius of the front segment of the curved secondary edge is in the range of 0.1-2.0 mm, the radius of the intermediate segment is in the range of 1.6-10.0 mm, and the radius of the rear segment is in the range of 0.1-1.0 mm, the front segment radius always being smaller than the intermediate segment radius, and greater than the rear segments radius irrespective of the absolute sizes thereof.

9. The drill according to claim 8, wherein the axial length of the intermediate segment is in the range of 0.1 to 0.5 mm.

10. The drill according to claim 6, wherein the cutting edges are disposed on a body attached to the front end portion of the shaft.

11. The drill according to claim 10, wherein the body is releasably attached to the shaft.

12. The drill according to claim 10, wherein the body is formed of cemented carbide and is soldered to the shaft.

13. The drill according to claim 1, wherein the radius of the front segment of the curved secondary edge is in the range of 0.1-2.0 mm, the radius of the intermediate segment is in the range of 1.6-10.0 mm, and the radius of the rear segment is in the range of 0.1-1.0 mm, the front segment radius always being smaller than the intermediate segment radius, and greater than the rear segments radius irrespective of the absolute sizes thereof.

14. The drill according to claim 13, wherein the axial length of the intermediate segment is in the range of 0.1 to 0.5 mm.

15. The drill according to claim 10, wherein an inner end portion of the cutting edge is straight.

* * * * *